(12) United States Patent
Marascu et al.

(10) Patent No.: US 10,311,159 B2
(45) Date of Patent: Jun. 4, 2019

(54) MINING OF COMPOSITE PATTERNS ACROSS MULTIPLE MULTIDIMENSIONAL DATA SOURCES

(71) Applicant: International Business Machines Corporation, Armonk, NY (US)

(72) Inventors: Alice-Maria Marascu, Dublin (IE); Themis Palpanas, Povo (IT); Olivier Verscheure, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 14/829,203

(22) Filed: Aug. 18, 2015

(65) Prior Publication Data
US 2017/0053007 A1    Feb. 23, 2017

(51) Int. Cl.
  *G06F 17/30*    (2006.01)
(52) U.S. Cl.
  CPC .. *G06F 17/30572* (2013.01); *G06F 17/30345* (2013.01)
(58) Field of Classification Search
  CPC ....................................................... G06F 17/30
  See application file for complete search history.

(56) References Cited

U.S. PATENT DOCUMENTS

| 8,046,322 | B2 | 10/2011 | Wang et al. |
| 8,583,686 | B2 | 11/2013 | McGregor |
| 2013/0346447 | A1* | 12/2013 | Wu ................... G06F 17/30876 707/776 |
| 2015/0373132 | A1* | 12/2015 | Mukherji ............... H04L 67/18 709/203 |
| 2017/0161337 | A1* | 6/2017 | Yao ................... G06F 17/30539 |

OTHER PUBLICATIONS

R. Agrawal et al., Fast algorithms for mining association rules in large databases. In Proceedings of the 20th International Conference on Very Large Data Bases, VLDB '94, pp. 487-499, San Francisco, CA, USA, 1994.
G. Chen, et al., Mining Sequential Patterns Across Data Streams, 2005.
J. Guo, et al., Mining frequent patterns across mulitple data streams. In Proceeding of the 20th ACM International Conference of Information and Knowledge Management, CIKM '11, pp. 2325-2328, New York, NY, USA, 2011. ACM.

(Continued)

*Primary Examiner* — Khanh B Pham
(74) *Attorney, Agent, or Firm* — Cahn & Samuels, LLP

(57) ABSTRACT

An embodiment of the invention includes a processor can identify one or more simple patterns in at least one data stream of the data streams. The simple pattern can include repetition of a data object of the data objects. The processor can also identify one or more multi-patterns in at least one data stream of the data streams, wherein the multi-pattern can include repetition of a data block. The data block can include at least two contiguous data objects that are in the same order in the data block. The processor can identify one or more composite patterns in at least two data streams of the data streams, wherein the composite pattern can include data objects on each of the at least two data streams that repeat together in the same pattern.

13 Claims, 13 Drawing Sheets

(56) References Cited

OTHER PUBLICATIONS

H.T. Lam, et al., Online discovery of top-k similar motifs in time series data. In SDM'11, pp. 1004-1015, 2011.
S. Laxman, et al., A fast algorithm for finding frequent episodes in event streams.In Proceedings of the13th ACM SIGKDD international conference of knowledge discovery and data mining, KDD '07, pp. 410-419, New York, USA, 2007. ACM.
A. Mueen et al., Online discovery and maintenance of time series motifs. In Proceeding of the 16th ACM SIGKDD International conference on Knowledge discovery and data mining, KDD '10, pp. 1089-1098, New York, NY, USA, 2010. ACM.
A. Mueen et al., Exact discovery of time series motifs. In SDM, 2009.
A. Mueen, et al., A disk-aware algorithm for time series motif discovery. Data Mining and Knowledge Discovery, 22 (1-2):73-105, 2011.
D. Patnaik, et al., Efficient episode mining of dynamic event streams. In Data Mining (ICDM), 2012 IEEE 12th International Conference on, pp. 605-614, 2012.
J. Pei, et aL, Preif xspan: Mining sequential patterns efficiently by preif x-projected pattern growth. pp. 215-224, 2001.
L. Wan, et al. Mining frequent serial episodes over uncertain sequence data. In Proceedings of the 16th International Conference on Extending Database Technology, EDBT '13, pp. 215-226, New York, NY, USA, 2013. ACM.
S.-Y. Yang, et al. Incremental mining of across-streams sequential patterns in multiple data streams. In Academic Journal, p. 449, 2011.

\* cited by examiner

MINING OF COMPOSITE PATTERNS ACROSS MULTIPLE MULTIDIMENSIONAL DATA SOURCES

BACKGROUND

The present invention relates to systems, methods, and computer program products for mining of composite patterns across multiple multi-dimensional data sources.

Input from multiple applications can include sets of different data coming from different providers (e.g., sensors, database stored data) that can monitor the same main objective (e.g., a building) or monitor correlated objectives (e.g., transportation related objectives such as buses, bicycles, parking, etc.). Mining for patterns can have numerous applications and can assist in solving problems like clustering, classification, or anomaly detection. Various fields such as biology, network monitoring, telecommunications, and medicine are fertile fields for pattern mining.

SUMMARY OF THE INVENTION

An embodiment of the invention provides a system and method for identifying patterns in data streams, each data stream including a linear sequence of data objects. A processor can identify one or more simple patterns in at least one data stream of the data streams. The simple pattern can include repetition of a data object of the data objects. The processor can also identify one or more multi-patterns in at least one data stream of the data streams, wherein the multi-pattern can include repetition of a data block. The data block can include at least two contiguous data objects that are in the same order in the data block.

Furthermore, the processor can identify one or more composite patterns in at least two data streams of the data streams, wherein the composite pattern can include data objects on each of the at least two data streams that repeat together in the same pattern. In at least one embodiment, the identifying of the one or more composite patterns includes identifying a first data object and/or a first data block on a first data stream of the data streams, and identifying a second data object and/or a second data block on a second data stream of the data streams, wherein, when the first data object and/or first data block occurs on the first data stream, the second data object and/or second data block occurs on the second data stream in the same position relative to the first data object and/or first data block.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

For definitional purposes and as applicable the term "simple pattern" as used herein can include a subsequence of length 1 of 1 multidimensional point.

As used herein "multi-pattern" can include an ordered union of one or several sequences of "simple patterns".

As used herein "composite pattern" can include a set of multi-patterns spread over several streams and respecting temporal constraints among the multi-patterns.

At least one embodiment of the invention provides a system that includes or is in connection with a set of different sensors that monitor a certain geographical area. For example, the sensors can monitor bus speeds, bus routes, bicycle routes, bicycle availability, weather conditions, etc. Patterns of interest may include frequent speed values and sequences of speed values that occur often together. Other patterns that may be observed include: when the weather becomes sunny, in an interval of k minutes, there is no bicycles available to rent in the area and the buses speed pattern correspond to non-congested traffic; when the rain starts, in 1 minutes the bicycle depots are full, no more bicycles can be parked, and the traffic becomes congested in m minutes.

Figure 1:
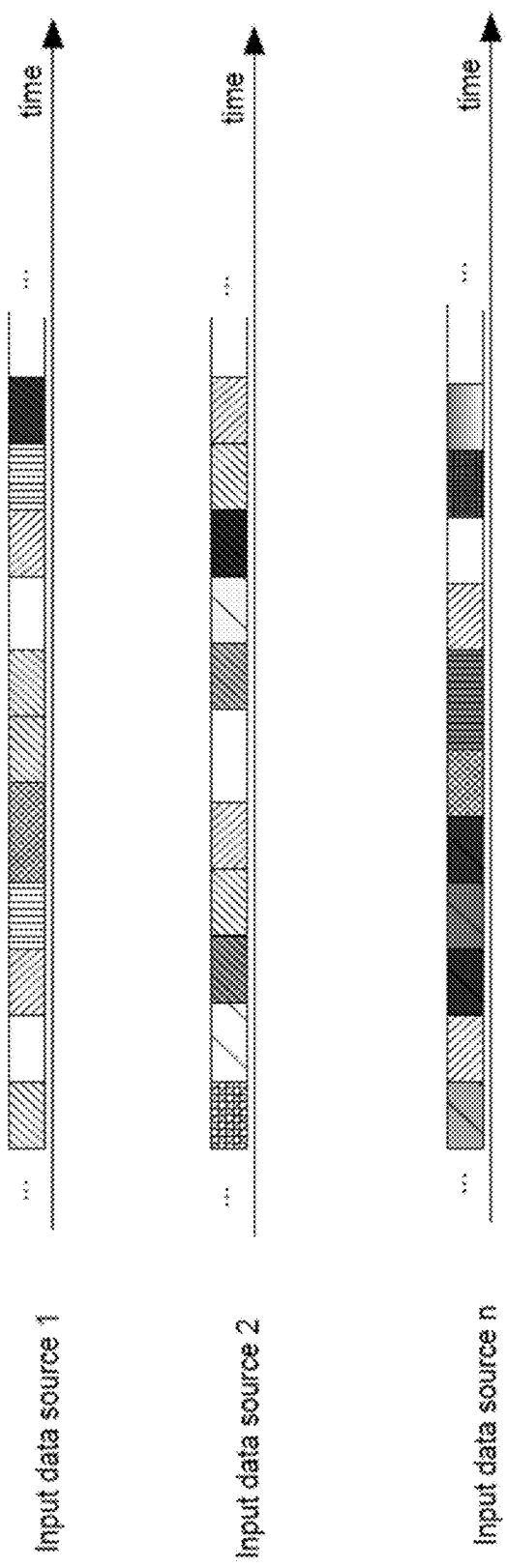
FIG. 1 is a diagram illustrating three data streams according to an embodiment of the invention.

FIG. 1 is a diagram illustrating three data streams according to an embodiment of the invention. More specifically, in this example, a first data stream includes input from data source 1, a second data stream includes input from data source 2, and an additional (i.e., third) data stream includes input from data source n. Each data stream includes a linear sequence of data objects over a certain time period.

Figure 2:
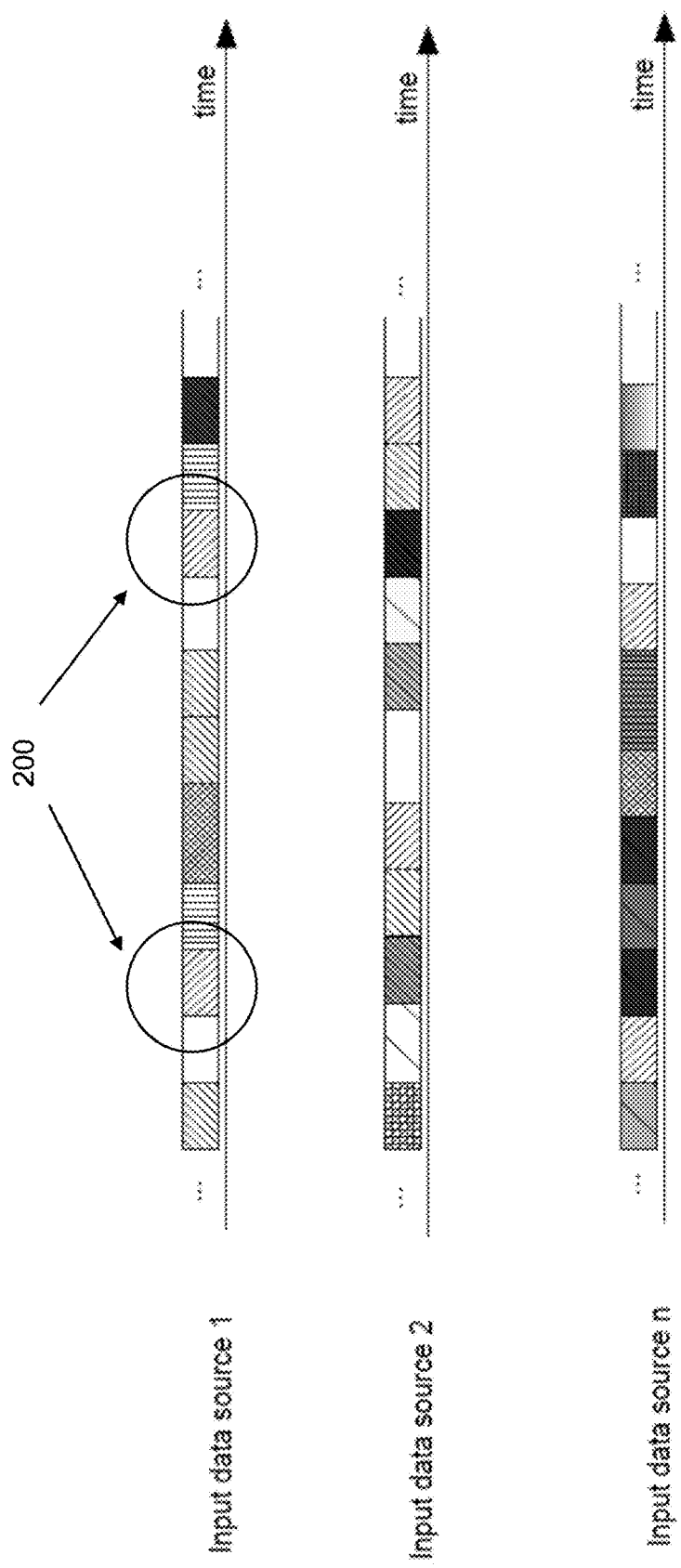
FIG. 2 is a diagram illustrating the identification of a simple pattern in the first data stream of the data streams illustrated in FIG. 1 according to an embodiment of the invention.

FIG. 2 is a diagram illustrating the identification of a simple pattern in the first data stream of the data streams illustrated in FIG. 1 according to an embodiment of the invention. A simple pattern 200 can include a repetition of a data object in a data stream.

Figure 3:
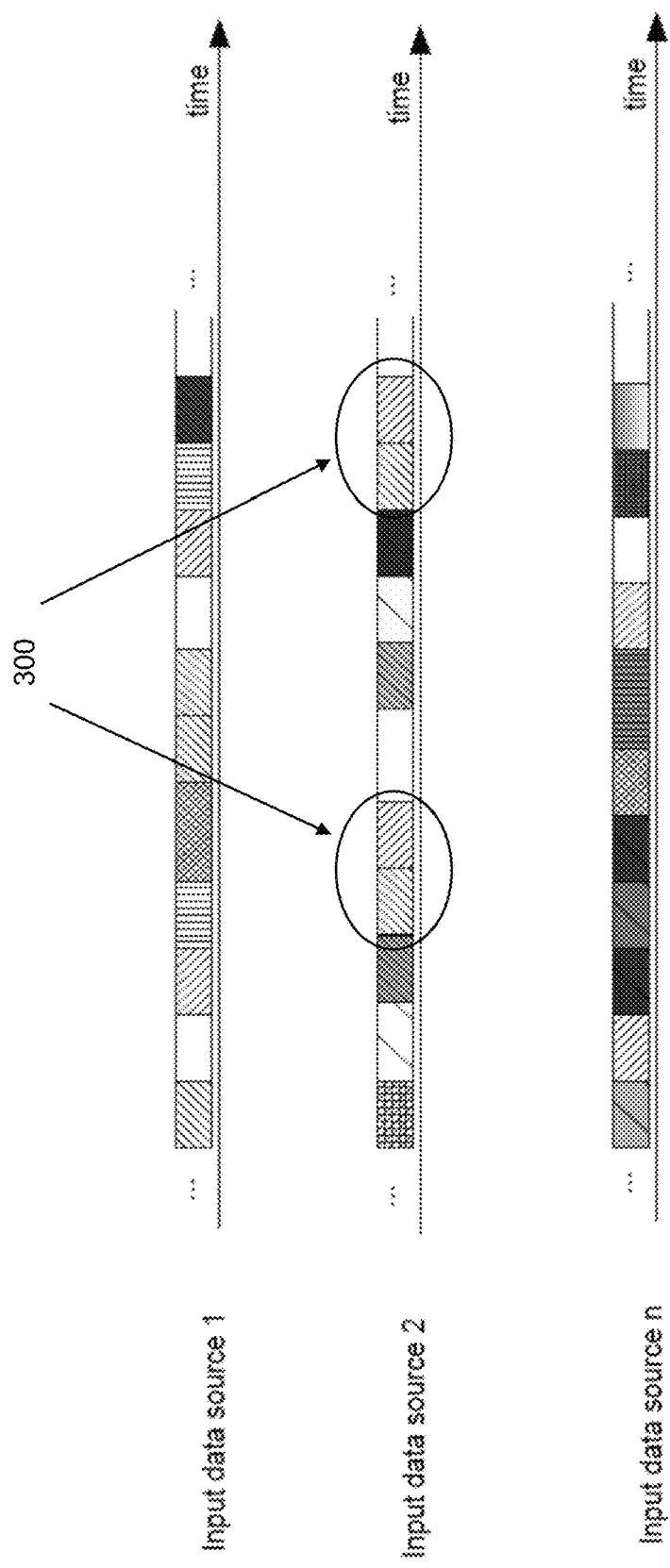
FIG. 3 is a diagram illustrating the identification of a multi-pattern in the second data stream of the data streams illustrated in FIG. 1 according to an embodiment of the invention.

FIG. 3 is a diagram illustrating the identification of a multi-pattern in the second data stream of the data streams illustrated in FIGS. 1 and 2 according to an embodiment of the invention. A multi-pattern 300 can include a repetition of a data block, the data block including at least two contiguous data objects that are in the same order in the data block.

Figure 4:
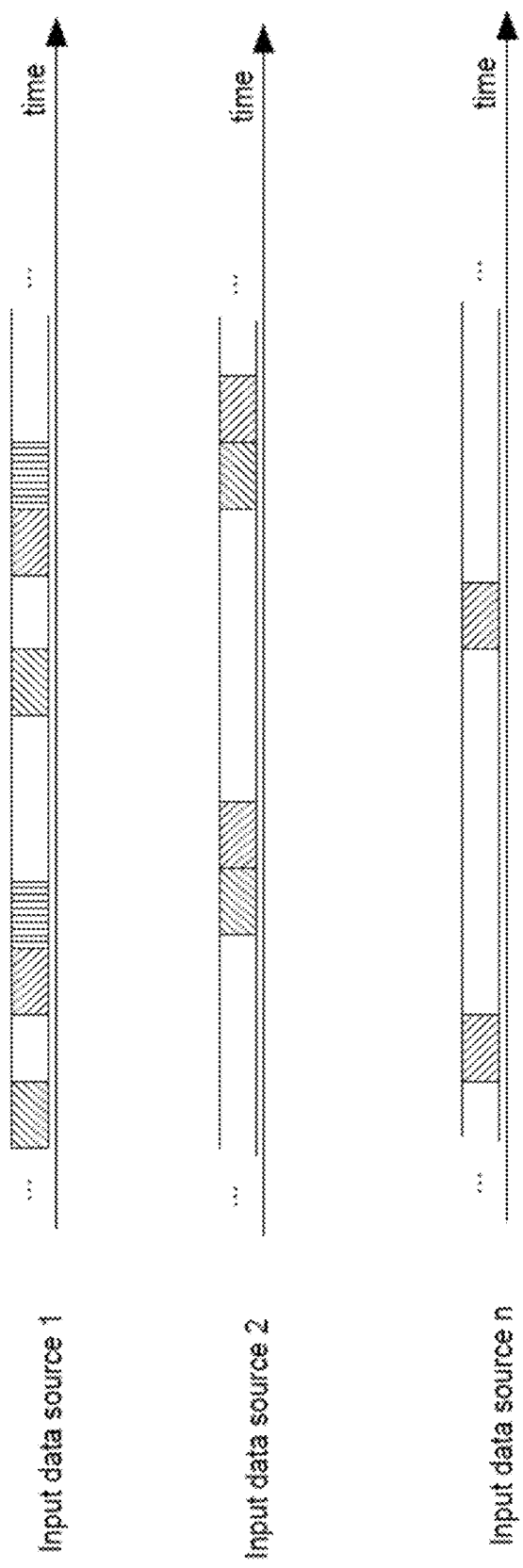
FIG. 4 is a diagram illustrating the identification of multi-patterns in the first data stream and the second data stream of the data streams illustrated in FIG. 1 according to an embodiment of the invention.

FIG. 4 is a diagram illustrating the identification of multi-patterns in the first data stream and the second data stream of the data streams illustrated in FIG. 1 according to an embodiment of the invention, wherein other data objects have been removed to highlight the multi-patterns. The first data stream includes six multi-patterns: 1) slash data object—empty data object—back slash data object—vertical line data object (4 data objects); 2) slash data object—empty data object (2 data objects); 3) empty data object—back slash data object (2 data objects); 4) back slash data object—vertical line data object (2 data objects); 5) slash data object empty data object—back slash data object (3 data objects); and 6) empty data object—back slash data object—vertical line data object (3 data objects). The multi-patterns repeat over time. The second data stream includes one multi-pattern: slash data object—back slash data object (2 data objects). The third data stream includes one simple pattern: back slash data object (1 data object).

Figure 5:
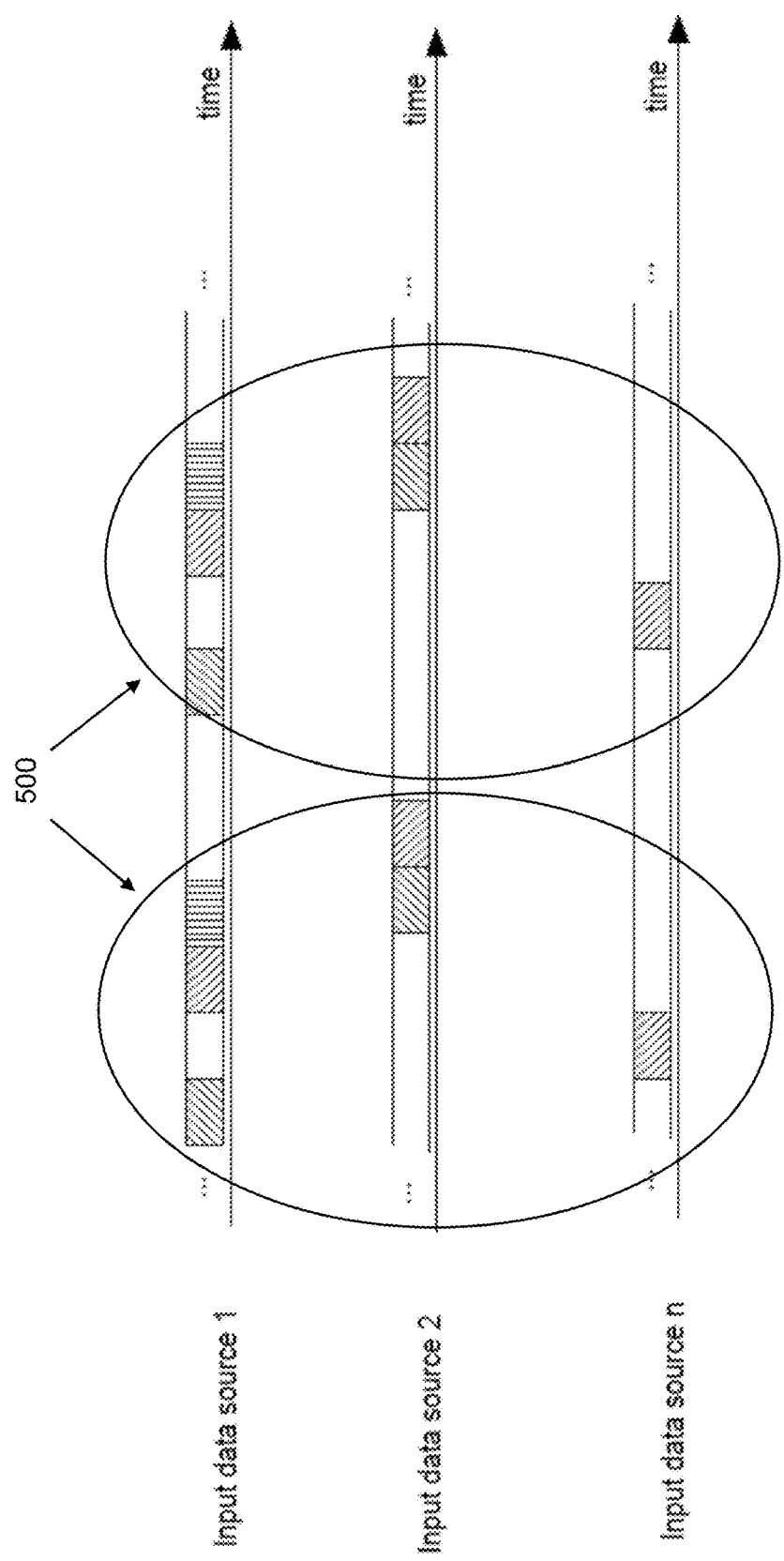
FIG. 5 is a diagram illustrating the identification of a complex pattern in the data streams illustrated in FIG. 1 according to an embodiment of the invention.

FIG. 5 is a diagram illustrating the identification of a composite pattern in the data streams illustrated in FIG. 1 according to an embodiment of the invention. A composite pattern 500 can include data objects on two or more data streams that repeat together in the same pattern.

Figure 6:
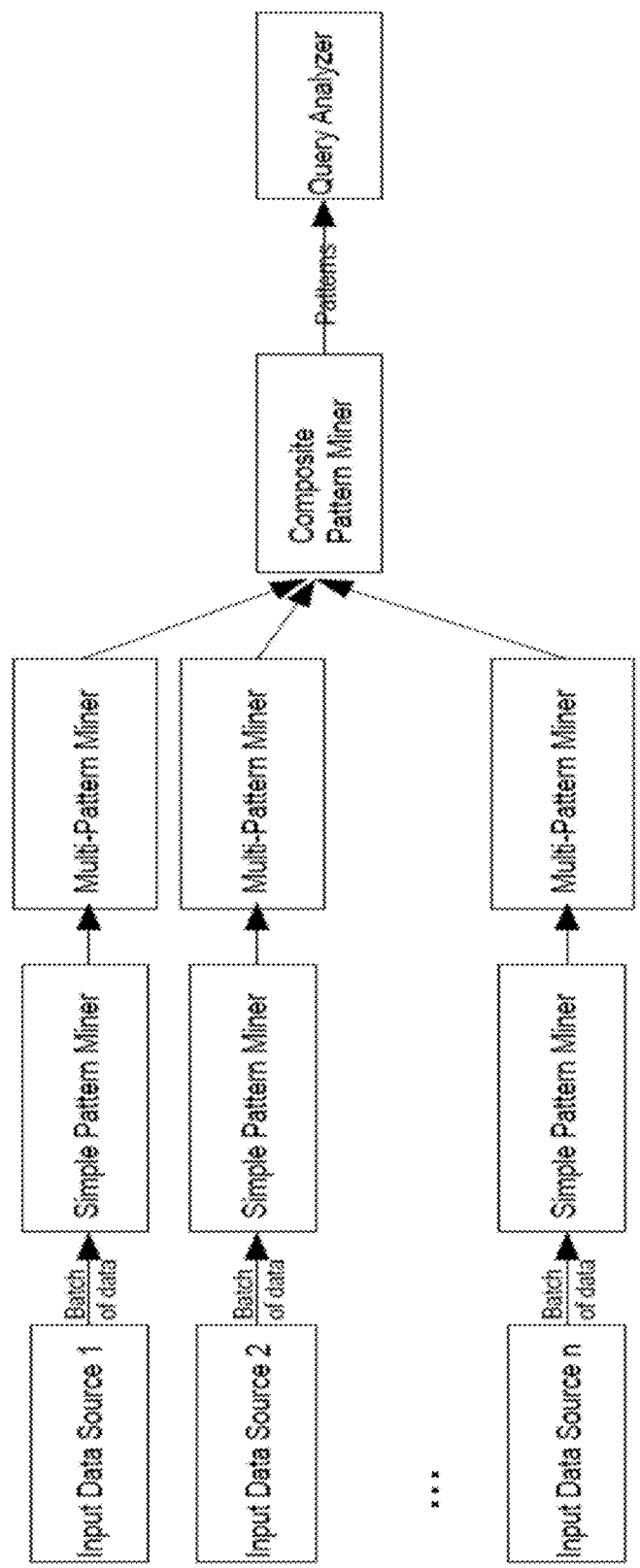
FIG. 6 is a flow diagram illustrating a method of mining patterns across multiple data sources for analysis according to an embodiment of the invention.

FIG. 6 is a flow diagram illustrating a method of mining patterns across multiple data sources for analysis according to an embodiment of the invention. Batches of data can be input into one or more simple pattern miners from input data source 1, input data source 2, and/or input data source n in order to identify simple pattern(s). The data can then be input into one or more multi-pattern miners in order to identify multi-pattern(s). The data can then be input into a composite pattern miner in order to identify composite pattern(s), which can be sent to a query analyzer.

Therefore, at least one embodiment of the invention allows mining and maintenance of composite patterns over time, based on a method for mining of variable length patterns from each individual stream (both closed and not closed, maximal and non-maximal), along with sequences of several such patterns, a method for mining complex patterns spread over several data sources/streams, of different shapes, supports, and intra-gaps between the sub-patterns elements, and a method for temporal frames matching.

Patterns can be first developed horizontally and then vertically. This can lead to a framework allowing different settings for each single data source/stream and direct integration into a batch processing environment (e.g., MapReduce).

The methods can apply to multidimensional data sources/streams (numerical, categorical, symbolic) and to static and online mining. The result can be used as a summary of data sources/streams; and, the same framework can mine low frequency patterns (anomalies). The views can be extendable or restrictive on more or less data sources/streams, and in any moment of the processing. All of the patterns (simple, multi, and composite) can be accessed simultaneously and in any moment.

Aspects of the present invention may be embodied as a system that can identify a pattern on a stream of individual items from a single data source. Furthermore, the system can identify more complex patterns that are spread over several data input sources and that have different sub-patterns of different shapes and characteristics in different input data sources (e.g., data recording: bus speeds, bus trajectories, bike trajectories and availability in an area, and weather conditions).

The following provides an illustrative example: a set of data is provided from sources monitoring a certain geographical area and having data coming from various input data sources (e.g., bus speeds, bus trajectories, bike trajectories and availability in that area, weather conditions, etc.). Examples of patterns, that can vary from simpler to more complex, include: "frequent speed values", "sequences of speed values that occur often together", "when the weather becomes sunny, in an interval of k minutes, there is no more bike available to rent in that area and that the buses speed pattern correspond to a non-congested traffic", "when the rain starts, in 1 minutes the bikes places are full, no more bikes can be parked, and the traffic becomes congested in m minutes". One entity may be monitored by several data sources corresponding to several activities or devices. The system can overlook several data sources at once and extract complex patterns during the lifetime of an application.

At least one embodiment of the invention includes a method for the mining of frequent composite patterns across multiple multidimensional data sources/streams, including mining simple patterns from each individual data source/stream, mining multi-patterns from each individual data source/stream, and mining composite patterns with respect to several (or all) input data sources/streams. A composite pattern can be a set of frequent multi-patterns across n data sources and satisfying a temporal set of constraints. The input data/streams can be segmented with respect to the same time range defined observation window and that slides in time. The method can mine closed and maximal composite patterns for historical knowledge mining and maintenance.

Figure 7:
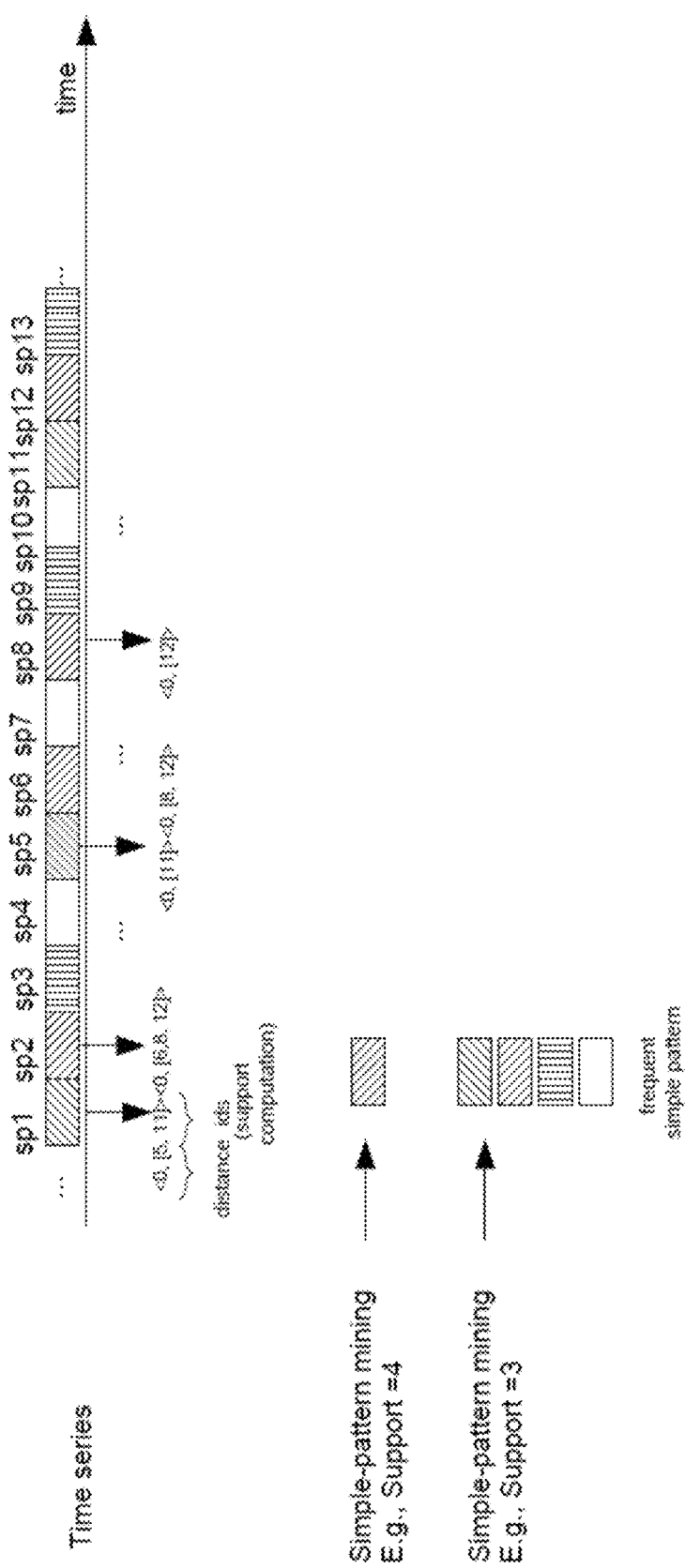
FIG. 7 is a diagram illustrating simple pattern mining according to an embodiment of the invention.

FIG. 7 is a diagram illustrating simple pattern mining according to an embodiment of the invention. The sp1 data block is identical to the sp5 and sp11 data blocks (<0, [5, 11]>). The "0" indicates that the distance between sp1 and sp5 is zero, and also the distance between sp1 and sp11 is zero. The sp2 data block is identical to the sp6, sp8, and sp12 data blocks (<0, [6, 8, 12]>). The sp5 data block is identical to the sp11 data block (<0, [11]>). The sp6 data block is identical to the sp8 and sp12 data blocks (<0, [8, 12]>). The sp8 data block is identical to the sp12 data block (<0, [12]>).

For a support of a value 4, the frequent simple pattern mining is sp2 because it is present at least 4 times in the data stream (i.e., sp1, sp5, sp11, sp14). The simple pattern mining support for the slash data object, back slash data object, vertical line data object, and empty data object is 3 because each of the data objects are present at least 3 times in the data stream (sp1, sp5, sp11, sp14; sp2, sp6, sp8, sp12; sp3, sp9, sp13; sp4, sp7, sp10; respectively).

Figure 8:
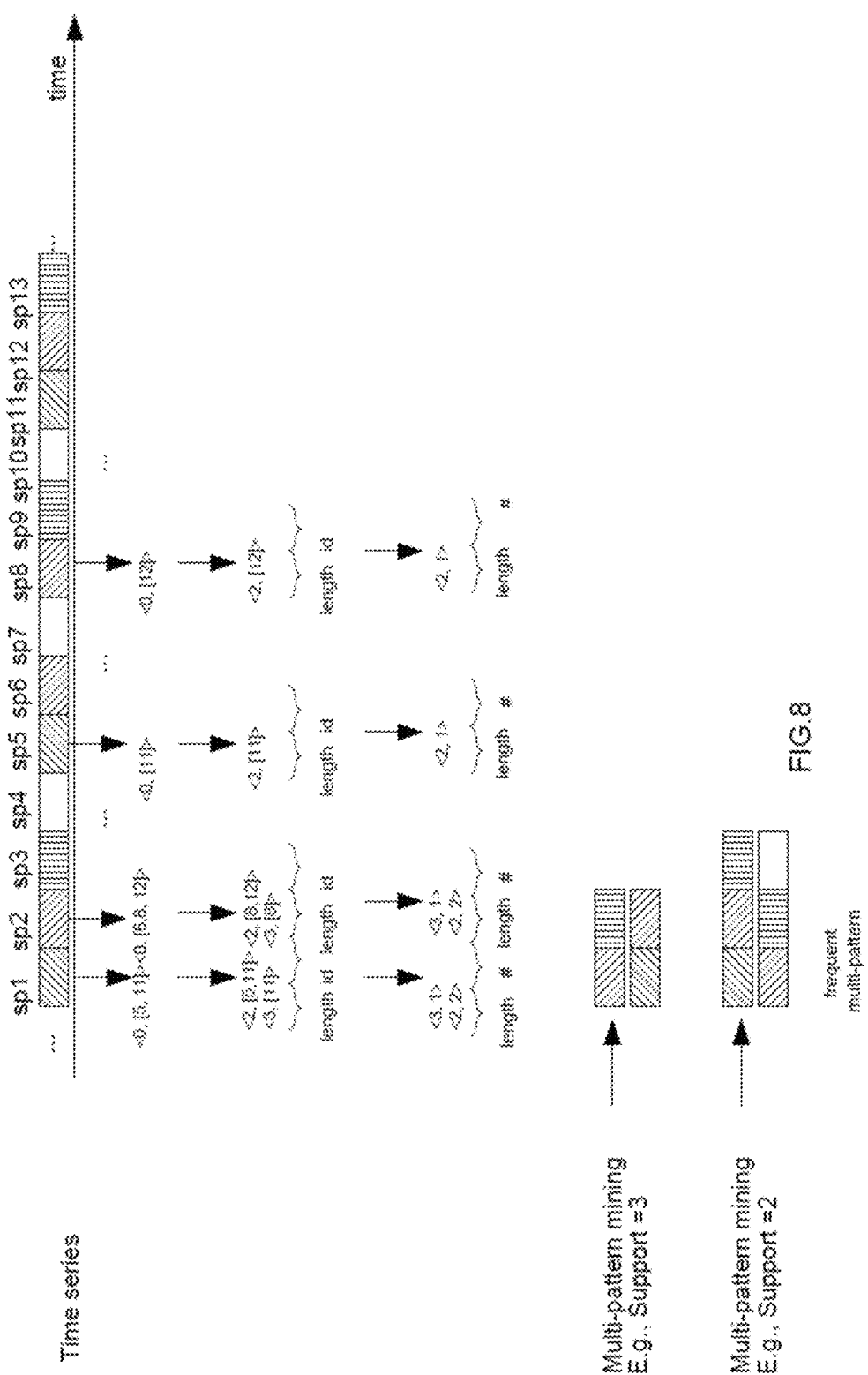
FIG. 8 is a diagram illustrating multi-pattern mining according to an embodiment of the invention.

FIG. 8 is a diagram illustrating multi-pattern mining according to an embodiment of the invention. The multi-pattern slash data object and back slash data object is present at sp1 and sp2, and repeats again twice, starting at sp5 and sp11 (<2, [5, 11]>). The "2" indicates that the multi-pattern is 2 data blocks long (the number of blocks of the multi-pattern starting at the position).

The multi-pattern back slash data object and vertical line data object is present at sp2 and sp3, and repeats again twice, starting at sp8 and sp12 (<2, [8, 12]>). The "2" indicates that the multi-pattern is 2 data blocks long. The multi-pattern slash data object, back slash data object, and vertical line data object is present at sp1, sp2, and sp3, and repeats again starting at sp11 (<3, [11]>). The "3" indicates that the multi-pattern is 3 data blocks long. The multi-pattern back slash data object, vertical line data object, and empty data object is present at sp2, sp3, and sp4, and repeats again starting at sp8 (<3, [8]>). The "3" indicates that the multi-pattern is 3 data blocks long.

The multi-pattern slash data object and back slash data object is present at sp5 and sp6, and repeats again starting at sp11 (<2, [11]>). The multi-pattern back slash data object and vertical line data object is present at sp8 and sp9, and repeats again starting at sp12 (<2, [12]>).

The multi-pattern mining support for the back slash data object and vertical line data object is 3 because the multi-pattern present at least 3 times in the data stream (starting at sp2, sp8, and sp12). The multi-pattern mining support for the slash data object and back slash data object is 3 because the multi-pattern present at least 3 times in the data stream (starting at sp1, sp5, and sp11). The multi-pattern mining support for the slash data object, back slash data object, and vertical line data object is 2 because the multi-pattern present at least 2 times in the data stream (starting at sp1 and sp11).

Figure 9:
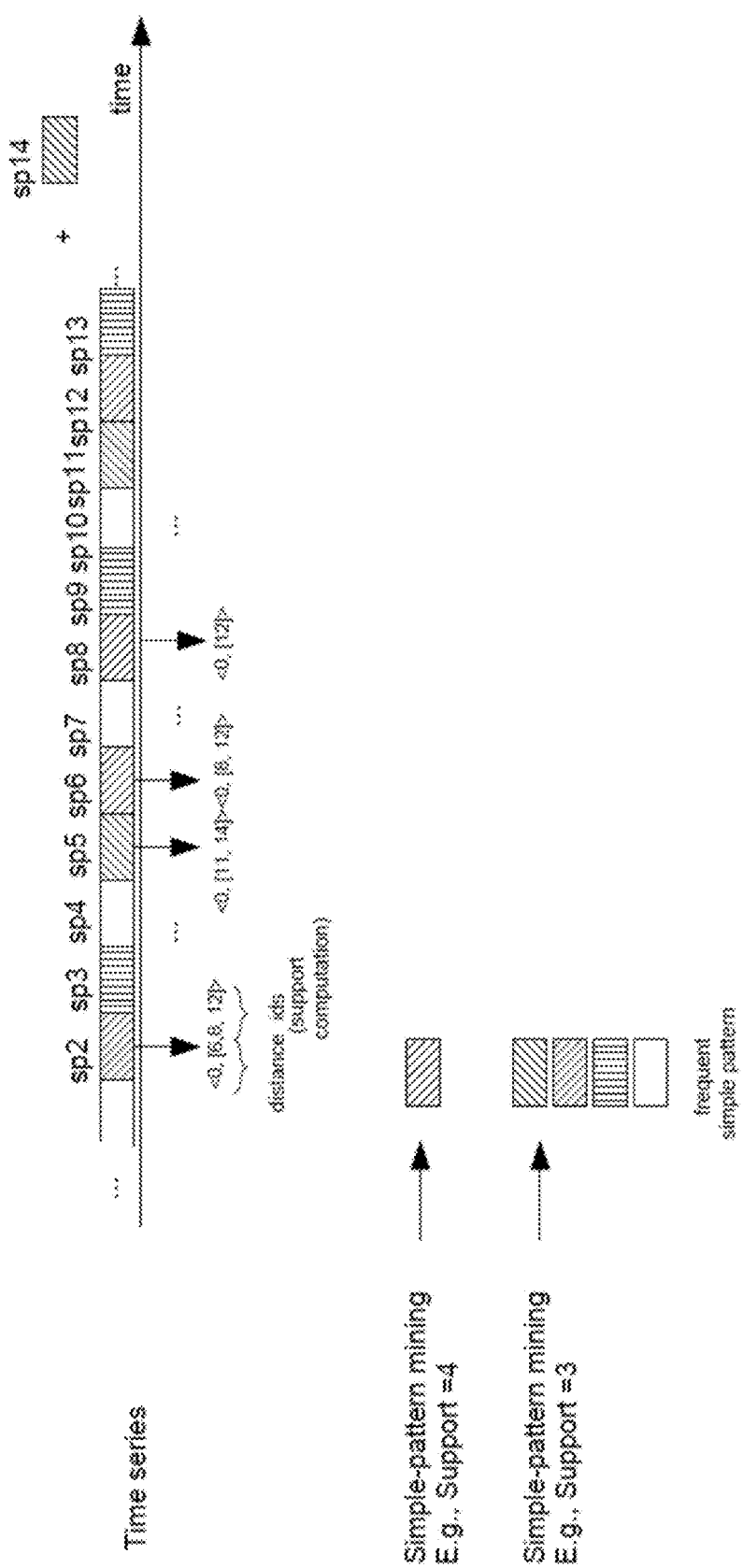
FIG. 9 is a diagram supporting one embodiment of the invention

FIG. 9 illustrates the simple-pattern mining when the window is slit with 1 element (sp14 arrives and sp1 is erased).

Figure 10:
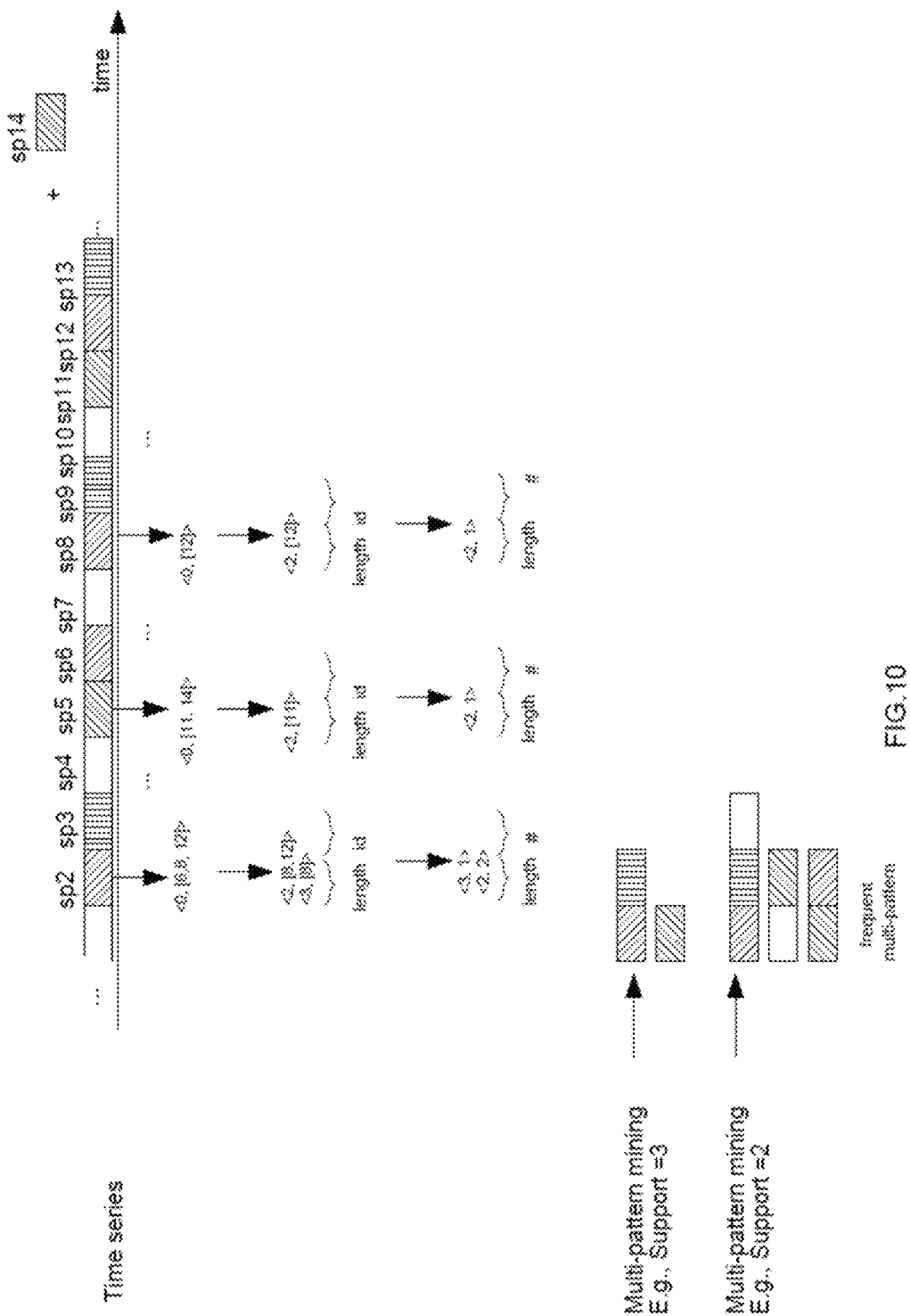
FIG. 10 is a diagram supporting one embodiment of the invention

FIG. 10 illustrates the multi-pattern mining when the window is slit with 1 element (sp14 arrives and sp1 is erased). One multi-pattern corresponding to a support value of 3 is the back slash data object and vertical line data object as it appears at least 3 times in the data stream (starting at sp2, sp8, and sp12). Another multi-pattern corresponding to a support value of 3 is a simple-pattern of slash data object, sp 5, as it appears at least 3 times (starting at sp5, sp11 and sp14).

One multi-pattern corresponding to a support value of 2 is the back slash data object, vertical line data object and empty data object as it appears at least 2 times in the data stream (starting at sp2 and sp8). One multi-pattern corresponding to a support value of 2 is the empty data object and slash data object as it appears at least 2 times in the data stream (starting at sp4 and sp10). One multi-pattern corresponding to a support value of 2 is the slash data object and backslash data object as it appears at least 2 times in the data stream (starting at sp5 and sp11).

A simple pattern miner can mine for the patterns corresponding to a first definition. In at least one embodiment, the first definition is a frequent simple-pattern in a data stream with respect to a support, wherein given T a data stream (or a data stream restricted to an observation window) and s $\in N^*$, a frequent simple-pattern is an element of T that occurs at least a percentage equal of higher than s in the data stream T (or in the data stream segment restricted to the observation window). This can be either a multidimensional point of the data stream or a sequence of consecutive 1-dimensional points of the data stream.

A multi-pattern miner can work on the results of the simple pattern miner and check for patterns corresponding to a second definition. In at least one embodiment, the second definition is a frequent multi-pattern in a data stream with respect to a support, wherein given T a data stream (or a data stream restricted to an observation window) s $\in N^*$, a frequent multi-pattern is a union of subsequences of frequent simple-patterns that occur all together and in the same temporal order at least a percentage of times equal or higher than s with respect to the data stream T (or in the data stream segment restricted to the observation window). This component forms multi-patterns by combining, in an efficient way, the information from the lists keeping the track of simple patterns.

If the two previous components work on a single stream, a composite pattern miner can work across streams and take as input multi-patterns and computes patterns corresponding to third definition. In at least one embodiment, the third definition is a distance based frequent multi-pattern in a data stream with respect to a minimum distance threshold, wherein given T a data stream (or a data stream restricted to an observation window) d $\in N^*$, a distance based frequent multi-pattern is any of the elements of a set containing all the closest closed multi-patterns having their similarity distance superior to d). The frequency in the definitions can be computed with respect to the observation window content or cumulated with the historical knowledge.

Methods for computing sequential patterns on top of the multi-patterns can be applied. Methods for composite pattern mining can be performed provided they are enhanced with temporal constraints to be respected. At least one method can extract the composite patterns using a candidate set generation based on a list tracking the candidates and forming candidates by joining the information of multi-pattern lists.

Figure 11:
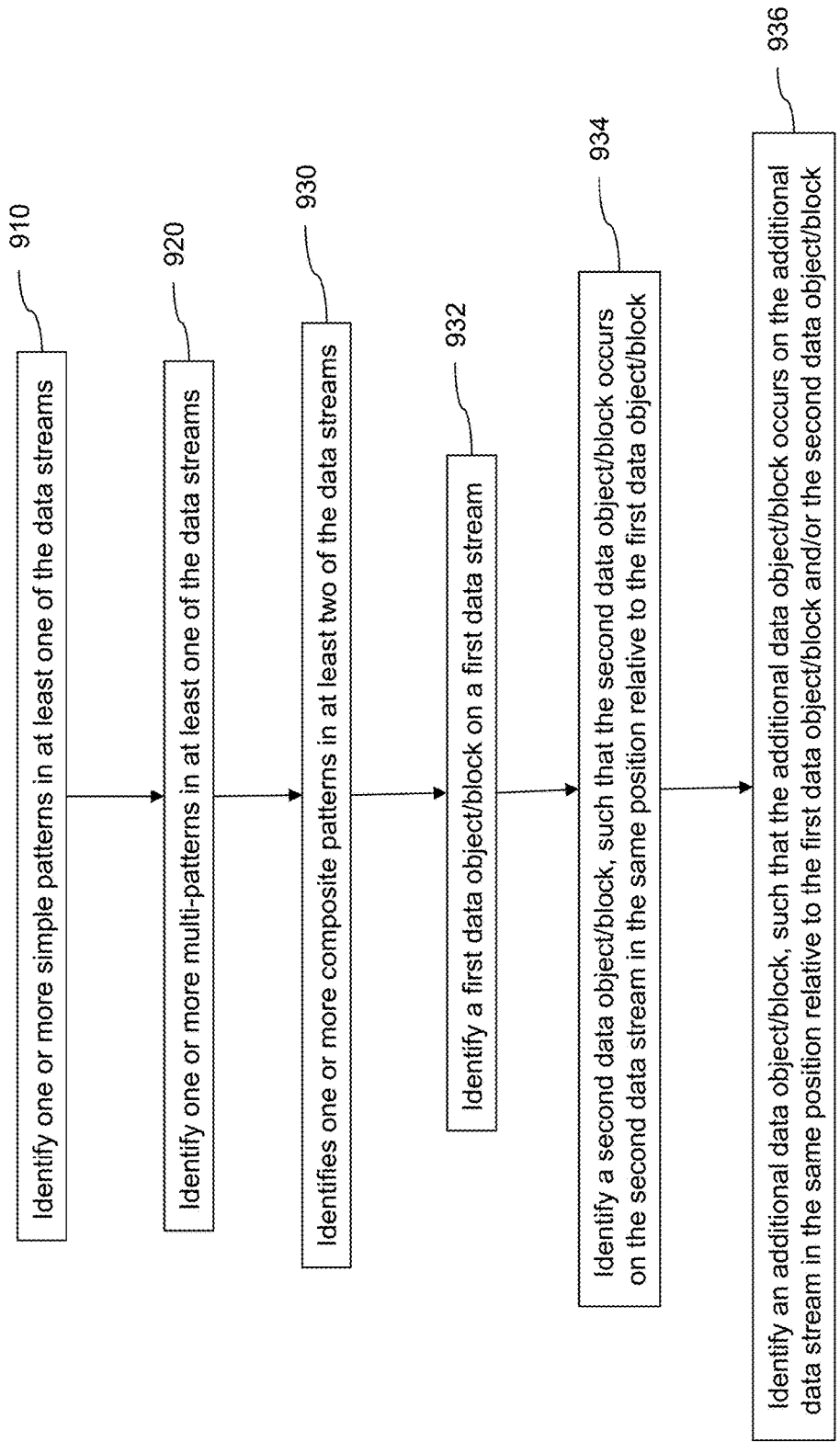
FIG. 11 is a flow diagram illustrating a method of identifying patterns in data streams according to an embodiment of the invention.

FIG. 11 is a flow diagram illustrating a method of identifying patterns in data streams according to an embodiment of the invention, wherein each data stream in the data streams includes a linear sequence of data objects (e.g., slash data object, empty data object, back slash data object, and vertical line data object as illustrated in the figures, but one of ordinary skill in the art should appreciate based on this disclosure that more or fewer data objects may be present). The data streams can be provided by different data sources. A processor can identify one or more simple patterns in at least one of the data streams 910, wherein the simple pattern includes repetition of a data object of the data objects.

The processor can also identify one or more multi-patterns in at least one of the data streams 920. The multi-pattern can include repetition of a data block, wherein the data block can include at least two contiguous data objects that are in the same order in the data block. A slash data object immediately followed by a back slash data object is an example of a data block that can be repeated. A slash data object immediately followed by a vertical line data object, which is immediately followed by a back slash data object is an example of another data block that can be repeated.

Thus, the processor can identify a first multi-pattern and a second multi-pattern, wherein the number of data blocks in the first multi-pattern (e.g., 2) is different from the number of data blocks in the second multi-pattern (e.g., 3). Moreover, the processor can identify a first multi-pattern, a second multi-pattern, and at least one additional multi-pattern, wherein the number of data blocks in the first multi-pattern is different from the number of data blocks in the second multi-pattern and the number of data blocks in the at least one additional multi-pattern, and wherein the number of data blocks in the second multi-pattern is different from the number of data blocks in the at least one additional multi-pattern.

In addition, the processor identifies one or more composite patterns in at least two of the data streams 930. The composite pattern can include data objects on each of the at least two data streams that repeat together in the same pattern.

In at least one embodiment, the processor identifies a first data object and/or a first data block on a first data stream, and identifies a second data object and/or a second data block on a second data stream. For example, in FIG. 4, the first data block includes the slash data object, the blank data object, the back slash data object, and the vertical line data object from input data source 1; and, the second data block includes the slash data object and back slash data object from input data source 2. When the first data object and/or first data block occurs on the first data stream, the second data object and/or second data block occurs on the second data stream in the same position or at the same distance relative to the first data object and/or first data block.

In another embodiment, the processor identifies a first data object and/or first data block on a first data stream 932, identifies a second data object and/or second data block on a second data stream 934, and identifies an additional data object and/or additional data block on an additional data stream 936. For example, in FIG. 4, the processor identifies a first data block on the first data stream that includes the slash data object, the blank data object, the back slash data object, and the vertical line data object.

The processor also identifies a second data block that is present on the second data stream, wherein the second data block includes the slash data object and back slash data object, and wherein the first data object of the second data block occurs at the same time as the last data object on the first data block. The processor further identifies a third data block that is present on the third data stream, wherein the third data block includes the back slash data object, and wherein the third data block occurs at the same relative distance from the second data object on the first data block. Thus, when the first data object and/or first data block occurs on the first data stream, the second data object and/or second data block occurs on the second data stream in the same position or at the same distance relative to the first data object and/or first data block, and the additional data object and/or additional data block occurs on the additional data stream in the same position or at the same distance relative to the first data object and/or first data block and the second data object and/or second data block.

In at least one embodiment, referring back to FIGS. 1-5, the first data stream from the input data source 1 includes data objects including data about bus locations, bus speeds, and/or bus routes; the second data stream from the input data source 2 includes data objects including data about bicycle locations, bicycle speeds, and/or bicycle routes; and, the third (i.e., additional) data stream from the input data source 3 includes data objects including data about weather (e.g., precipitation, temperature, humidity, barometric pressure, etc.).

As illustrated in FIG. 5, in one example, when there is X amount of precipitation (back slash data object on the third data stream), buses travel at an average of B miles per hour (blank data object on the first data stream). Immediately before there is X amount of precipitation, buses travel at an average of A miles per hour (slash data object on the first data stream); and, immediately after there is X amount of precipitation, buses travel at an average of C miles per hour (back slash data object on the first data stream). After that, buses travel at an average of D miles per hour (vertical line data object on the first data stream) and bicycles travel at an average of A miles per hour (slash data object on the second data stream). After that, bicycles travel at an average of C miles per hour (back slash data object on the second data stream). In the example illustrated in FIG. 5, this pattern occurs twice.

In another example, the first data stream includes data objects including data about bus locations, the second data stream includes data objects including data about bike share availability, and the third data stream includes data objects including data about temperature. In yet another example, the first data stream includes data objects that include blood test results for patient X, the second data stream includes data objects that include imaging test results for patient X, and the third data stream includes data objects that include for monitored parameters for patient X (e.g., body temperature, heartbeat, blood pressure).

In at least one embodiment of the invention, the composite pattern includes a first data object and/or a first data block on a first data stream of the data streams, and a second data object and/or a second data block on a second data stream of the data streams. When the first data object/block occurs on the first data stream, the second data object/block occurs on the second data stream at a position respecting the same temporal distance relation relative to the first data object/block.

The composite pattern can include a first data object and/or a first data block on a first data stream of the data streams, a second data object and/or a second data block on a second data stream of the data streams, and one or more additional data objects and/or additional data blocks on additional data stream(s) of the data streams. When the first data object/block occurs on the first data stream, the second data object/block occurs on the second data stream at a position respecting the same temporal distance relation relative to the first data object/block, and the additional data object/block occurs on the additional data stream(s) at position(s) respecting the same temporal distance relative to the first data object/block and the second data object/block.

In at least one embodiment, each simple pattern includes a list of pairs, the list of pairs including the length of a multi-pattern starting at a position of the simple pattern, and an ID of the next similar simple pattern. The list of pairs can be updated when a new data object is added and/or a data object is discarded. The list of pairs can be used to maintain a second list of pairs, the second list of pairs including the maximum length of a multi-pattern that can be extracted starting from the position of the simple pattern, and/or the number of similar multi-patterns that exist in the data set and succeeding the simple pattern temporally. Frequent multi-patterns can be extracted counting a frequency information from the second list of pairs.

Figure 12:
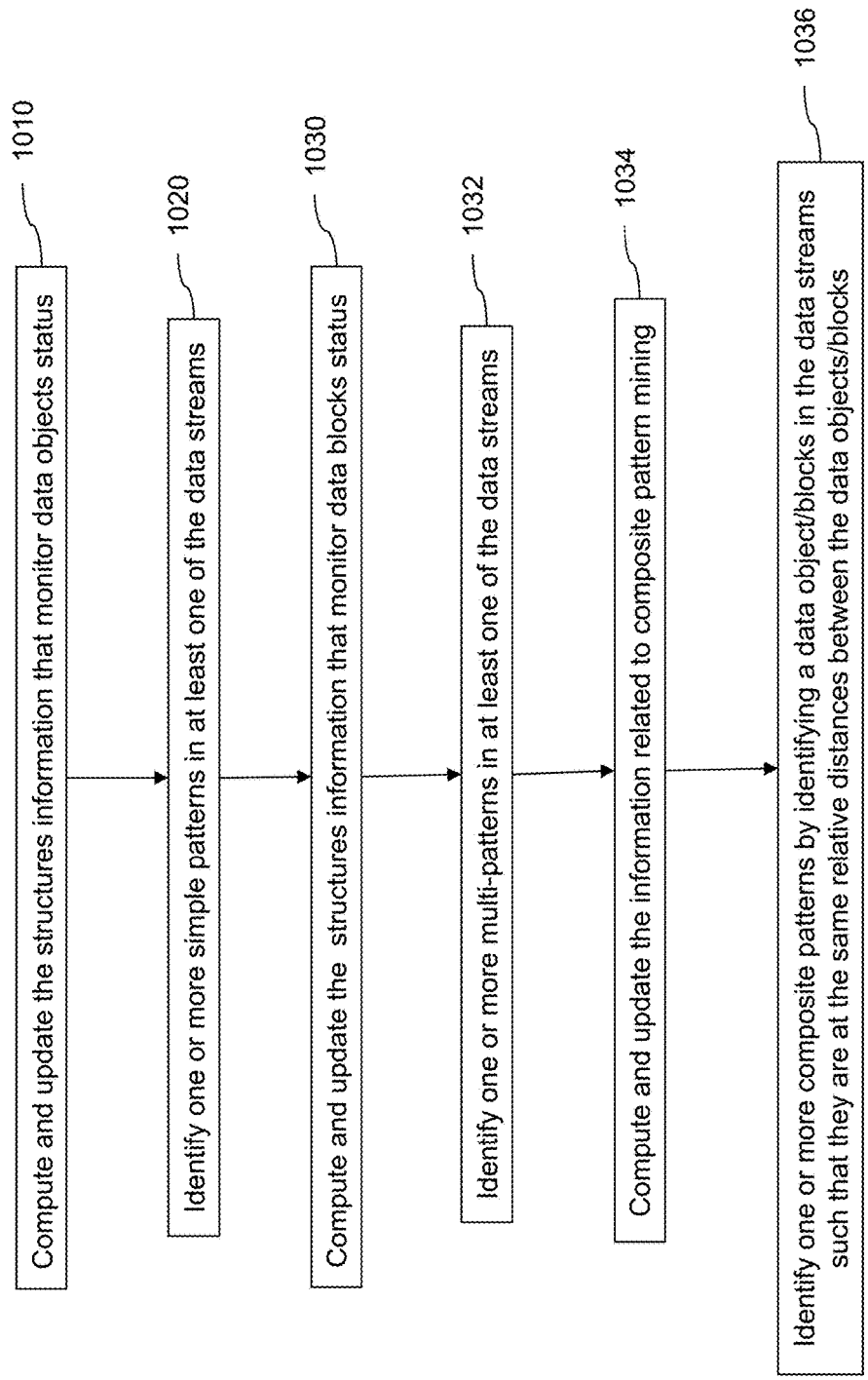
FIG. 12 is a flow diagram illustrating a method of identifying patterns in data streams according to another embodiment of the invention.

FIG. 12 is a flow diagram illustrating a method of identifying patterns in data streams according to another embodiment of the invention.

The structures information that monitor data objects status is computed and updated 1010. One or more simple patterns are identified in at least one of the data streams 1020. The structures information that monitor data blocks status is computed and updated 1030. One or more multi-patterns are identified in at least one of the data streams 1032. The information related to composite pattern mining is identified computed and updated 1034. One or more composite patterns are identified by identifying a data object/blocks in the data streams such that they are at the same relative distances between the data objects/blocks 1036.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
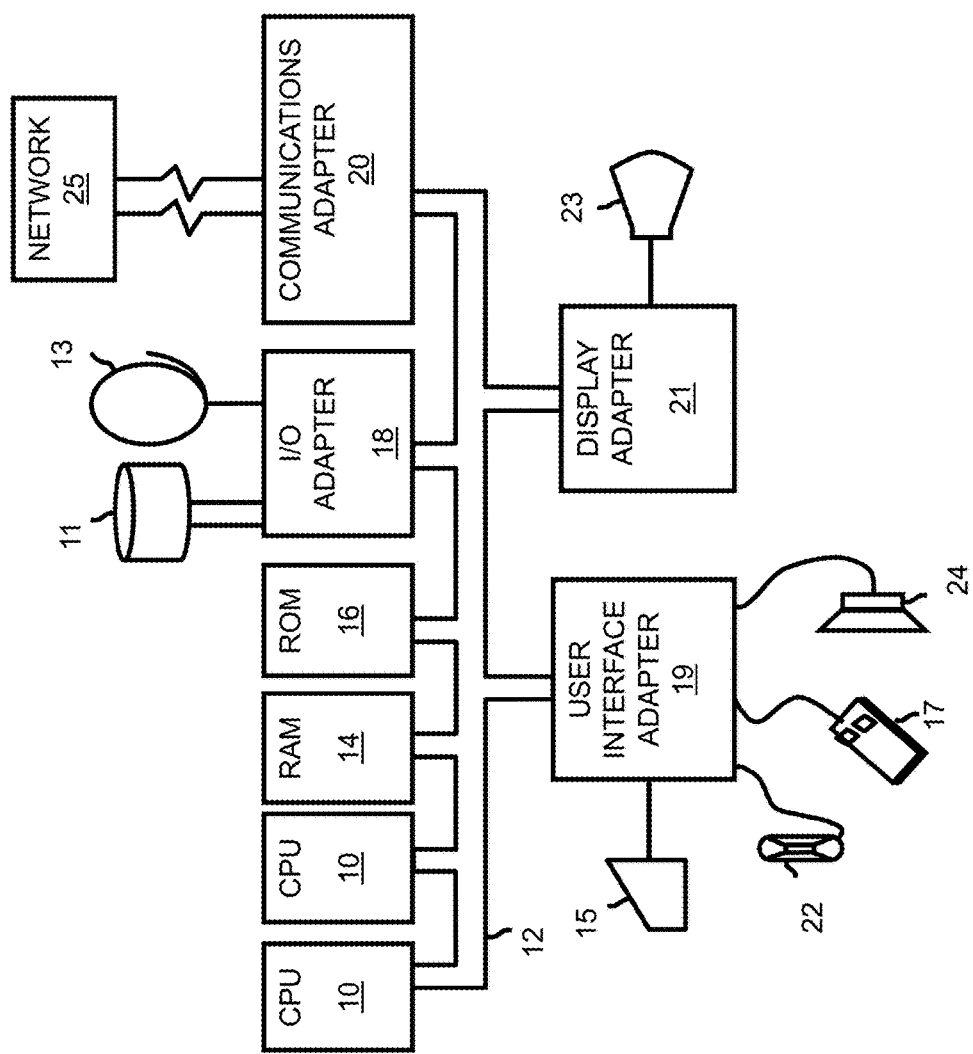
FIG. 13 is a diagram illustrating a computer program product for identifying patterns in data streams according to an embodiment of the invention.

Referring now to FIG. 13, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 610. The CPUs 610 are interconnected with system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of at least one embodiment of the invention. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of identifying patterns in data streams, said method comprising:
　receiving a plurality of data streams segmented in the same time range from one or more input data sources;
　identifying with a processor at least one simple pattern in at least one data stream of the plurality of data streams provided by different data sources, each data stream including a linear sequence of data objects, the simple pattern including repetition of a data object in the linear sequence of data objects;
　identifying with the processor at least one multi-pattern in at least one data stream of the plurality of data streams, the multi-pattern including repetition of a data block, the data block including at least two contiguous data objects that are in the same order in the data block;
　identifying with the processor at least one composite pattern between a first data stream and a second data stream by
　　identifying at least one first data object and a first data block in the first data stream and at least one second data object and a second data block in the second data stream that repeat together in the same pattern, and
　　analyzing correlations between the first data object and the second data object and the first data block and the second data block based on co-occurrences at the same position within the first and second streams, respectively;
　deriving with the processor new pattern data at the same position within the same time range based on the analyzing; and
　identifying and outputting anomalies by mining the new pattern data,
　wherein all patterns are accessed simultaneously.

2. The method according to claim 1, wherein each simple pattern includes a list of pairs, the list of pairs including:
　a length of a multi-pattern starting at a position of the simple pattern, and
　an ID of a next similar simple pattern,
　wherein the list of pairs is updated when at least one of:
　a new data object is added, and
　a data object is discarded,
wherein the list of pairs is used to maintain a second list of pairs, the second list of pairs including:
　a maximum length of a multi-pattern that can be extracted starting from the position of the simple pattern, and
　a number of similar multi-patterns that exist in the data set and succeeding the simple pattern temporally, and
　wherein frequent multi-patterns are extracted counting a frequency information from the second list of pairs.

3. The method according to claim 1, wherein the identifying of the at least one composite pattern further includes processing at least one of an additional data object and an additional data block occurs on an additional data stream at the same relative distance from the at least one of the first data object and the first data block and the at least one of the second data object and the second data block.

4. The method according to claim 1, wherein said identifying of the at least one multi-pattern includes identifying a first multi-pattern and a second multi-pattern,
　wherein a number of data blocks in the first multi-pattern is different from a number of data blocks in the second multi-pattern.

5. The method according to claim 1, wherein said identifying of the at least one multi-pattern includes identifying a first multi-pattern, a second multi-pattern, and at least one additional multi-pattern,
　wherein a number of data blocks in the first multi-pattern is different from a number of data blocks in the second multi-pattern and a number of data blocks in the at least one additional multi-pattern, and
　wherein the number of data blocks in the second multi-pattern is different from the number of data blocks in the at least one additional multi-pattern.

6. The method according to claim 1, wherein the processor is in connection with sensors that monitor a geographical area.

7. The method according to claim 6, wherein the one or more input data sources receive data streams related to at least one of bus speeds, bus routes, bicycle availability, and weather conditions.

8. The method according to claim 1, wherein a first data stream includes data comprising blood test results for a patient; a second data stream includes data comprising imaging test results for the patient; and a third data stream includes data comprising monitored parameters for the patient.

9. A device for identifying patterns in data streams, said device comprising:
　processing circuitry configured to
　　receive a plurality of data streams segmented in the same time range from one or more input data sources;
　　identify at least one simple pattern in at least one data stream of the plurality of data streams provided by different data sources, each data stream in the data streams including a linear sequence of data objects, the simple pattern including repetition of a data object of the data objects;
　　identify at least one multi-pattern in at least one data stream of the plurality of data streams, the multi-pattern including repetition of a data block, the data block including at least two contiguous data objects that are in the same order in the data block, identify at least one composite pattern between a first data stream and a second data stream by identifying at least one first data object and a first data block in the first data stream and at least one second data object and a second data block in the second data stream that repeat together in the same pattern, and analyzing correlations between the first data object and the second data object and the first data block and the second data block based on co-occurrences at the same position within the first and second streams, respectively, derive new pattern data at the same position within the same time range based on the analyzing, and identify and outputting anomalies by mining the new pattern data, wherein all patterns are accessed simultaneously.

10. The device according to claim 9, wherein said identifying of the at least one composite pattern further includes identifying at least one additional data object and an additional data block on an additional data stream, wherein, when the at least one first data object and first data block occur on the first data stream, the at least one additional data object and additional data block occur on the additional data stream in the same position relative to the at least one first data object and first data block and the at least one second data object and second data block.

11. The device according to claim 9, wherein said identifying of the at least one multi-pattern includes identifying a first multi-pattern and a second multi-pattern, wherein a number of data blocks in the first multi-pattern is different from a number of data blocks in the second multi-pattern.

12. The device according to claim 9, wherein said identifying of the at least one multi-pattern includes identifying a first multi-pattern, a second multi-pattern, and at least one additional multi-pattern, wherein a number of data blocks in the first multi-pattern is different from a number of data blocks in the second multi-pattern and a number of data blocks in the at least one additional multi-pattern, and wherein the number of data blocks in the second multi-pattern is different from the number of data blocks in the at least one additional multi-pattern.

13. A non-transitory computer-readable medium having computer-readable instructions stored thereon which when executed by a computer cause the computer to perform a method for identifying patterns in data streams, the method comprising:

receiving a plurality of data streams segmented in the same time range from one or more input data sources;

identifying at least one simple pattern in at least one data stream of the plurality of data streams provided by different data sources, each data stream including a linear sequence of data objects, the simple pattern including repetition of a data object in the linear sequence of data objects;

identifying at least one multi-pattern in at least one data stream of the plurality of data streams, the multi-pattern including repetition of a data block, the data block including at least two contiguous data objects that are in the same order in the data block;

identifying at least one composite pattern between a first data stream and a second data stream by identifying at least one first data object and a first data block in the first data stream and at least one second data object and a second data block in the second data stream that repeat together in the same pattern, and analyzing correlations between the first data object and the second data object and the first data block and the second data block based on co-occurrences at the same position within the first and second streams, respectively;

deriving new pattern data at the same position within the same time range based on the analyzing; and identifying and outputting anomalies by mining the new pattern data, wherein all patterns are accessed simultaneously.

* * * * *